(12) United States Patent
Kulkarni et al.

(10) Patent No.: US 11,874,921 B2
(45) Date of Patent: *Jan. 16, 2024

(54) DIGITAL PROTECTION THAT TRAVELS WITH DATA

(71) Applicant: McAfee, LLC, San Jose, CA (US)

(72) Inventors: Dattatraya Kulkarni, Bangalore (IN); Srikanth Nalluri, Bangalore (IN); Kamlesh Halder, Bangalore (IN); Venkatasubrahmanyam Krishnapur, Bangalore (IN); Sailaja K. Shankar, Cupertino, CA (US); Kaushal Kumar Dhruw, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,700

(22) Filed: May 11, 2022

(65) Prior Publication Data

US 2022/0269783 A1    Aug. 25, 2022

Related U.S. Application Data

(62) Division of application No. 16/572,579, filed on Sep. 16, 2019, now Pat. No. 11,347,848, which is a
(Continued)

(30) Foreign Application Priority Data

Sep. 27, 2013 (IN) .................. 4386/CHE/2013

(51) Int. Cl.
*G06F 21/56* (2013.01)
*G06F 21/57* (2013.01)

(52) U.S. Cl.
CPC .......... *G06F 21/56* (2013.01); *G06F 21/567* (2013.01); *G06F 21/577* (2013.01); *G06F 2221/033* (2013.01); *G06F 2221/034* (2013.01)

(58) Field of Classification Search
CPC ... H04L 9/3247; H04L 63/0428; H04L 67/02; H04L 2209/80; H04L 63/0442;
(Continued)

(56) References Cited

U.S. PATENT DOCUMENTS 5,987,610 A * 11/1999 Franczek .............. H04L 63/145
  726/24
6,073,142 A *  6/2000 Geiger ................. G06Q 10/107
  709/204

(Continued)

FOREIGN PATENT DOCUMENTS

CN    102073820 A    5/2011
CN    102272771 B    12/2011
EP      2541978 A1    1/2013

OTHER PUBLICATIONS

Aug. 16, 2018—Chinese Patent Office—Second Office Action from counterpart Chinese Patent Application No. 201380079676.8 dated Aug. 16, 2018 with English Translation 12 pages.
(Continued)

*Primary Examiner* — Sharif E Ullah
(74) *Attorney, Agent, or Firm* — Patent Capital Group

(57) ABSTRACT

The present disclosure relates to a system and method for performing anti-malware scanning of data files that is data-centric rather than device-centric. In the example, a plurality of computing devices are connected via a network. An originating device creates or first receives data, and scans the data for malware. After scanning the data, the originating device creates and attaches to the data a metadata record including the results of the malware scan. The originating device may also scan the data for malware contextually-relevant to a second device.

20 Claims, 9 Drawing Sheets

Related U.S. Application Data division of application No. 14/911,140, filed as application No. PCT/US2013/075129 on Dec. 13, 2013, now Pat. No. 10,417,417.

(58) Field of Classification Search
CPC ..... H04W 12/06; H04W 12/04; H04W 12/10; H04W 12/02; H04W 4/02; H04W 4/12; G06Q 20/3829; G06Q 10/06313; G06Q 20/065; G06Q 20/3224; G06Q 10/02; G06Q 10/0833; G06F 21/56; G06F 21/567; G06F 21/577
USPC .......... 726/2, 21, 23, 36; 713/150, 163, 181; 380/255, 264, 276
See application file for complete search history.

(56) References Cited

U.S. PATENT DOCUMENTS

| | | | | |
|---|---|---|---|---|
| 6,460,050 B1* | 10/2002 | Pace | ............ | H04L 63/14 |
| 7,506,155 B1* | 3/2009 | Stewart | ............ | H04L 63/145 |
| | | | | 713/150 |
| 2008/0148403 A1* | 6/2008 | Manion | ............ | G06F 21/56 |
| | | | | 726/22 |
| 2012/0028606 A1* | 2/2012 | Bobotek | ............ | H04L 51/212 |
| | | | | 455/411 |
| 2012/0174225 A1* | 7/2012 | Shyamsunder | ............ | G06F 21/56 |
| | | | | 726/24 |
| 2012/0272320 A1* | 10/2012 | Rados | ............ | G06F 21/564 |
| | | | | 726/23 |
| 2013/0111547 A1* | 5/2013 | Kraemer | ............ | G06F 21/554 |
| | | | | 726/1 |
| 2013/0111591 A1* | 5/2013 | Topan | ............ | H04L 63/14 |
| | | | | 726/24 |
| 2016/0188878 A1* | 6/2016 | Kulkarni | ............ | G06F 21/577 |
| | | | | 726/22 |

OTHER PUBLICATIONS

Chinese Patent Office First Office Action in Chinese Patent Application No. 201380079676.8 dated Jan. 19, 2018 with English Translation 41 pages.

International Search Report and Written Opinion in International Application No. PCT/US2013/075129 dated Jun. 23, 2014, 8 pages.

\* cited by examiner

DIGITAL PROTECTION THAT TRAVELS WITH DATA

CROSS-REFERENCE TO RELATED APPLICATIONS

This Application is a divisional application of U.S. patent application Ser. No. 16/572,579, filed Sep. 16, 2019, and entitled "DIGITAL PROTECTION THAT TRAVELS WITH DATA," which is a divisional application of U.S. patent application Ser. No. 14/911,140, filed Feb. 9, 2016, and entitled "DIGITAL PROTECTION THAT TRAVELS WITH DATA," which is a National Stage application under 35 U.S.C. 371 of International App. No. PCT/US13/75129 filed Dec. 13, 2013, and entitled "DIGITAL PROTECTION THAT TRAVELS WITH DATA," which claims priority to Indian Patent App. Serial No. 4386/CHE/2013, filed Sep. 27, 2013, and entitled "DATA-CENTRIC ANTI-MALWARE SOLUTION." The disclosures of the prior applications are considered part of and are incorporated by reference in their entirety in the disclosure of this application.

TECHNICAL FIELD

This application relates to the field of computer security, and more particularly to a data-centric anti-malware solution.

BACKGROUND

Software, binaries, advertising, web pages, and other data provided to users (collectively "applications") may include privacy leaks, intrusive collection of private data, malicious code, spyware, viruses, ransomware, potentially-unwanted programs, rootkits, worms, trojans, unsafe or unsuitable advertising, security holes, unexpected harmful behaviors, misconfiguration, or other flaws, intentional or inadvertent (collectively "malware") that may pose security and privacy issues for users. Some known security systems (referred to herein as "scanners" are configured to detect malware and block, remove, delete, or otherwise remove its functionality from the system.

These security systems are typically "device-centric", where malware detection results and operations are limited to the device on which the security system is provided. Generally speaking, a security system on a device ensures the safety of the data arriving to the device only. To provide a secured system of computers, security software is usually required to be present on every computer. This requirement incurs costs from implementing the security systems on every computer, and can often be cumbersome to ensure that every computer has the security software, and the security software is up-to-date. In some cases, devices may not have the computational capacity to have a security system. In other cases, as users acquire and use many devices and switch between multiple devices, it becomes complex and cumbersome effort to ensure all the devices are protected by a security software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Malware continues to grow even while the device and operating system landscape goes through rapid transformation. Responsive to the malware threat, numerous "device-centric" anti-malware solutions are available. That is, protection is applied to the applications, data, device, and content consumption on a specific device. However, changes to how users interact with their devices present novel challenges. For example, the number of devices used in a family is rapidly increasing and the number of cloud services, including for example social network services, is also rapidly increasing. As a result user-generated content or data may move fluidly from the device it was originally created on into cloud storage services, other devices, or social networks. In some such cases, the digital protection provided by device-centric malware solutions may not be optimally effective on such data.

Device-Centric Security Systems

In certain example anti-malware solutions, each device may have its own local scanning engine. This may require multiple devices to scan the same data as it moves from device to device. In other example anti-malware solutions, global scanning engines in the cloud may be used, such as those in email services. In some cases, these are only accessible while using specific services from a specific vendor. As the number of devices increases, cloud-based anti-malware engines may face scalability issues and require additional computing. Further, in some anti-malware solutions, entire file content must be uploaded to the cloud service, which may be wasteful of resources such as network bandwidth and lose valuable time between arrival of data and detection of malware Cloud-based anti-malware solutions may also fail to account for variances in computing platforms and device context. In fact, using email as a scanning an expensive workaround that runs into many limitations, including limits on sizes of attachments. It should also be noted that sharing within a family may occur via a local Wi-Fi network. Such sharing can be very efficient given high Wi-Fi throughputs. However, because such sharing may not touch a cloud server, cloud-based services may not be configured to scan shared data.

Figure 1:
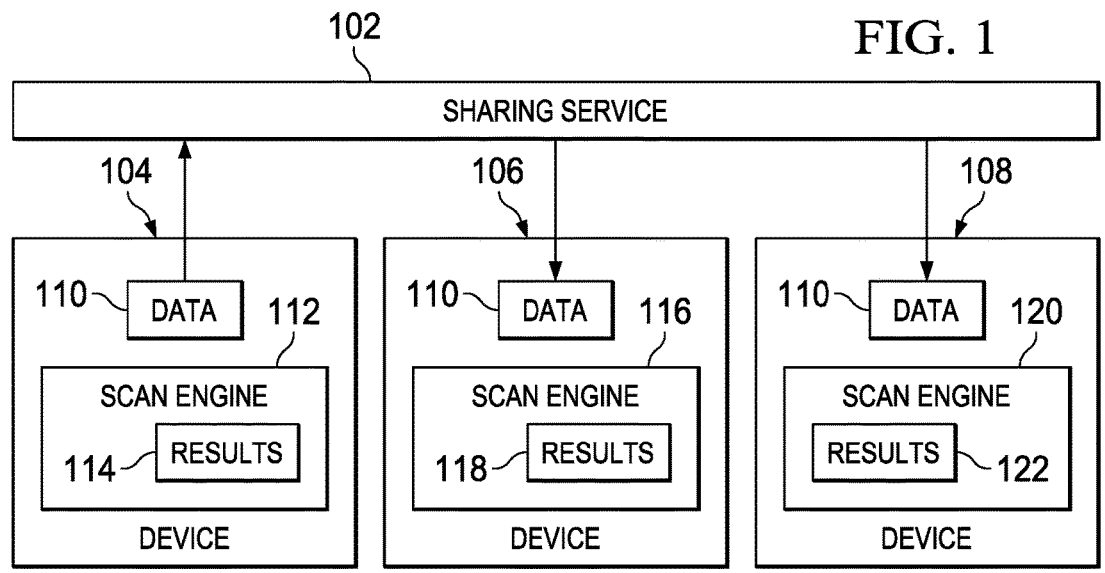
FIG. 1 is a block diagram illustrating a device-centric anti-malware solution.

Turning now to the attached figures, FIG. 1 is a block diagram illustrating an example malware analysis across multiple devices. The system shown in FIG. 1 includes sharing service 102 (or referred to herein, "a sharing service system") which enables data to be shared between device 104, device 106, and device 108. Example of sharing service 102 includes a file sharing network, a cloud network storage service, a remote storage service, or any suitable system which enables data and files to be shared or transferred across multiple devices.

Data 110 is shared using sharing service, and a copy of data 110 is provided from device 104 to device 106 and device 108. Each device has a respective scan engine. Device 104 has scan engine 112, and scanning data 110 generates results 114 limited to device 104. Device 106 has scan engine 116, and scanning data 110 generates results 118 limited to device 106. Device 108 has scan engine 120, and scanning data 110 generates results 112 limited to device 108.

In this example, the malware scanning is device-centric in that scan engine on each device scans the data that is resident on the device or shared through a sharing service. The engines do not co-operate or share the knowledge from the scanning engines. Thus, the resulting scans are tightly coupled to the device and the resident scan engine. As a result, as data moves between devices, scanning engines re-analyse the data for presence of malware. In fact, even if data has been previously scanned, the user may not have assurance of protection without re-scanning the data on the device he is accessing the data from.

Some email systems may offer the feature of scanning scan email attachments for its users. However, such scan results (often binary), indicating whether the file has a virus or does not have a virus is usually insufficient. For one reason, the scan result does not provide any information related to the device which scanned the file, such as the reputation of the device, the type of security software used, OS platform version, etc. For another reason, the scan results do not provide information about the scan itself, such as how it was scanned (scan parameters), target platforms for which the scanner scanned, when it was scanned, etc. For yet another reason, the scan results do not provide information related to the user who sent the data, such as the reputation of the user, how the user is linked to any user (on receipt of safety status), etc. For yet a further reason, the scan results do not provide any privacy reputation information of the file.

Security that Travels with Data

To alleviate some of these issues, the present disclosure describes several solutions for providing digital security that travels with data. According to one aspect, a safety status is associated with data and the safety status (e.g., a metadata record, or broadly referred to as a "record") is provided to and made accessible to any user who accesses the data. This way, the safety solution is "data-centric", so that the users accessing the data know about the safety even without having a security solution on their device.

The present disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiment many have different advantages, and no particular advantage is necessarily required of any embodiment.

In one example, systems and methods for performing anti-malware scanning of data files are data-centric rather than device-centric. In the example, a plurality of computing devices are connected via a network. An originating device creates or first receives data, and scans the data for malware using a security scanner. After scanning the data, the originating device, e.g., using a file sharing client, creates and attaches a metadata record to the data including the results of the malware scan. Different from conventional file sharing services, the originating device not only shares the data file, the originating device also shares the metadata record. The originating device, e.g., using a security scanner, may also scan the data for malware contextually-relevant to a second device. A file sharing client having a record reader (e.g., security client for performing the functions disclosed herein for the receiving device) may then read/interpret the metadata record and inform the user of the metadata record associated with the data file at the second device.

In one example, a method and service is provided to move security protection, i.e., a metadata record, along with data, for example as the data moves across shared devices. The example method enables digital protection for data to travel with the data, without the bounds of the original device the data was resident on. In some examples, digital protection and security may follow even to a device without a local anti-malware solution or security scanner by virtue of an anti-malware solution on a device where the content originated.

The metadata record generated based on results from a security scanner provides meaningful and rich information to a user receiving the data to which the metadata record is associated. In a peer-to-peer scenario, the originating device generates the metadata record and provides the data and the metadata record to the receiving device. In a cloud service scenario, the originating device generates the metadata record and provides the record to a cloud service. The cloud service may augment the metadata record to provide other security information, e.g., by providing global threat information, and/or results from a cloud scanner. The metadata record is then made accessible by, e.g., a record reader at the receiving device.

In some embodiments, a record reader or the receiving device provides contextual information of the receiving device to the originating device ahead of time such that the record can be generated by the originating device according to the contextual information of the receiving device.

Depending on the architecture, as the metadata record travels, the metadata record can be augmented by other entities such as a cloud service, and/or a cloud scanner. The additional information advantageously supplements the information provided by the originating device. This concept is particularly powerful for gathering information related to reputation. Reputation information may sometimes require information from a historical or global perspective, which a cloud service or cloud scanner can provide more easily than the originating device.

A record reader at the receiving device (e.g., a security client configured to receive and read the metadata record)

can take the information in the metadata record and provide the information to the user receiving the data. In some cases, the record reader at the receiving device (or in some cases, the originating device and/or a cloud service) may augment the metadata record to adapt the record to the context of the receiving device. The record reader leverages the metadata record and informs the user whether the data file can be trusted or poses any security risks.

Metadata Record

In some embodiments, the metadata record provides a "safety status" that a user can use to determine whether a data file is to be trusted, or poses any security risks. The metadata record may include one or more of the following (or any derivation thereof), but not limited to:

- name of the file, or any suitable identifier of the file,
- MD5 hash of the file (or the file including the metadata record), or other suitable cryptographic hash (e.g., the SHA variants);
- device information associated with the originating device, the information comprises at least one of: reputation of the device ("user system reputation"), name/identifier of the security software, version of the security software; and operating system platform version;
- scan information associated with a security scanner which scanned the file, the information comprising at least one of: scan status or result(s) ("file reputation"), scan parameters, and target platforms for which the security scanner scanned.
- user information associated with a user of the originating device, the information comprising at least one of: reputation of the user of the first device ("user reputation"), and the manner in which the user of the originating device is linked to a user of the receiving device;
- privacy information comprising at least one of: privacy reputation of a user of the first device, and the manner in which the user of the originating device is linked to a user of the receiving device; and
- time stamp associated with the creation of the metadata record and/or the scan results.

Generally speaking, the metadata record may travel (i.e., traverse through the network) together with the data. In some cases, however, the metadata record may simply be linked to the data using a unique identifier for the data (e.g., a cryptographic hash) such that the device receiving the data can retrieve the metadata record from a network resource (e.g., a cloud service) and identify the metadata record associated with the data. In either scenarios, the security system remains "data-centric."

Illustrations: Metadata Record Information

An originating device may provide information indicating one or more of the following in a metadata record: file name, encrypted thumbnail, EXIF/ID3/Location tags, created/modified date, file size in bytes, file location(s), MD5 hash, shared with who, access log, device reputation, platform information, scan information (if scanned), which target platforms the file is safe for, user reputation, and privacy information.

If a cloud scan engine is used for augmenting the record provided by the originating device, the cloud scan engine may provide information indicating one or more of the following in a metadata record: scan reputation (e.g., TROJAN, App, Virus, Pup, etc.), scan status/result (e.g., DIRTY FOR SURE, not dirty, etc.), device reputation, and privacy information (e.g., file exposes social security information, credit card details, etc.).

Increasing Confidence

The objective is that a user receiving the file knows that the sender made an effort to send safe data. Objective is thus to help improve the confidence user receiving a file has without having a security software installed on the device. It is theoretically possible for small differences in the platform OS to invalidate the safety status. That is, a file that is safe on device A for user A could be unsafe on device B for user B, because of a small difference in the OS between device A and device B (e.g., device B having an OS update that makes the file unsafe). However, the benefit of improving the confidence for the user receiving the file remains, because the metadata record can still serve to increase the confidence of the user and provide some information guiding the user whether the file is likely to be safe.

The system and method of the present specification shifts the focus of security from a device-centric view to data and usage-centric view, which is necessitated by the emerging usages in cross device environments. For example, in one use case "Mom," operating a desktop computer, shares plans for an upcoming vacation via USB drive with "Dad," who views the plans on a tablet computer. In another example, "Brother" downloads a movie onto his laptop computer from a peer-to-peer network, and wants to share the movie over the family Wi-Fi network with "Sister," who will view it on a smart phone. The system and method of the present specification enables an anti-malware solution's scanning engine to expand its effectiveness beyond the single device on which it resides. For example, Mom's desktop computer and Brother's laptop computer may scan the vacation plans and the movie respectively, and attach to each malware-relevant metadata. Thus, when Dad receives the vacation plans and when Sister receives the movie, their devices will be able to recognize whether that data is safe for their receiving devices.

The method of the present specification provides a way for device-centric malware protection to become data- and usage-centric malware protection. The technique allows for digital protection to travel with data across target devices by dissociating the process of scanning data for malware from storage of the scanning result and by contextually delivering the result to appropriate devices.

Data-Centric Security System

Figure 2:
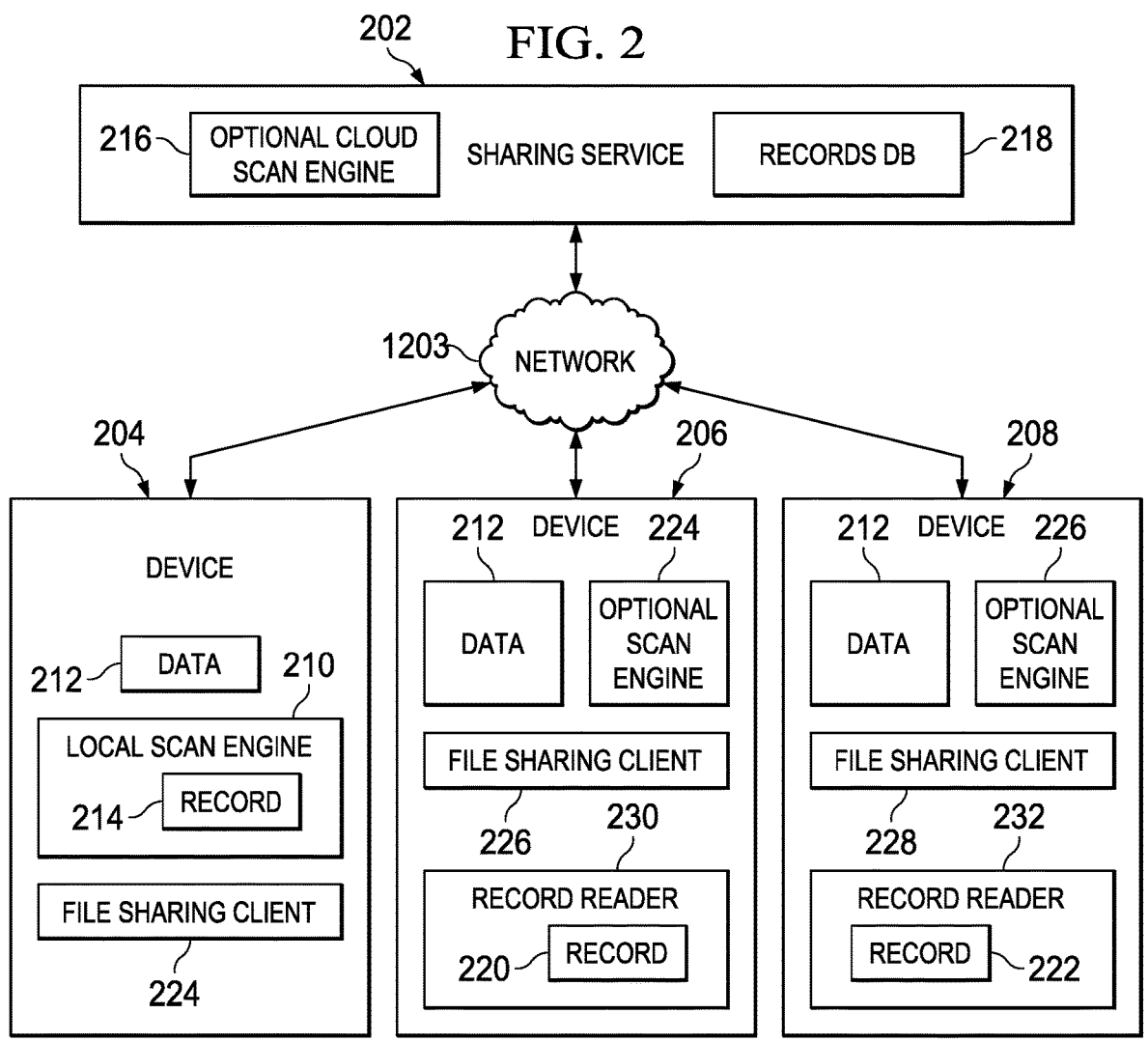
FIG. 2 is a block diagram illustrating a data-centric anti-malware solution according to one or more embodiments of the present specification.

Malware scanning may be realized according to the following example procedures. FIG. 2 is a block diagram illustrating a data-centric anti-malware method according to one or more example embodiments of the present specification. According to the method illustrated in FIG. 2, a metadata record from one device may travel with the data, so that even devices without scanning engines (or referred to broadly as security scanners) get the benefit of scanning results from the original device. The method of FIG. 2 uses a sharing service 202 in the cloud for convenience (sometimes referred to as "cloud service" or a "sharing service system"). In this example, device 204, device 206, and device 208 have access to sharing service 202. Specifically, each of device 204, 206, and 208 has a file sharing client, i.e., file sharing client 224, 226, and 228 respectively. Each file sharing client communicates over network 1203 with sharing service 202, and may also communicate over network 1203 among other file sharing clients. Network 1203 may include the Internet, an intranet, Local Area Networks, etc.

Device 204, e.g., using file sharing client 224, shares data 212 (or in some cases a data file or a file) to sharing service 202. That same data 212 is shared, via sharing service 202 and respective file sharing clients 226 and 228 of device 206 and device 208. It should be noted, however, that the service could easily be a peer-to-peer service resident on device 204, device 206, and device 208.

Local scan engine 210 (or security scanner) scans data 212 at device 204. Local scan engine 210 and/or device 204 creates a metadata record 214 (or referred to broadly as a record) associated with the data file. Record 214 is created based in part on results from the local scan engine 210. Record 214 may include one or more of the following: an identifier of data 212, a cryptographic hash of the data 212 (in some cases the cryptographic hash is of data 212 and at least a part of record 214), device information associated with device 204, scan information associated with local scan engine 210, user information associated with a user of the device 204, and a time stamp of record 214. Device 204 makes record 214 accessible by device 206 and device 208, e.g., using file sharing client 226 and file sharing client 228.

In some cases, device 204 uses sharing service 202 to provide data 212 from device 204 to device 206 and device 208. Using the same or different sharing service, device 210, e.g., using a file sharing client, can make record 214 accessible to device 206 and device 208. For instance, sharing service 202 may have records database 218 for storing records generated by local scan engines (database may be provided on non-transitory computer-readable medium). In this example, device 206 or device 208 can access record 214 from records database 218 of sharing service 202. In some embodiments, device 204 may not use a sharing service, but use a peer-to-peer mechanism to share data 212 and/or record 214 to device 206 and device 208.

Device 206 and device 208 may then have record 220 and record 222 respectively associated with data 212 (e.g., received at using file sharing client 226 and 228 respectively). Record reader 230 and 232 may then read record 220 and 222. Record 220 and record 222 can be derivable from record 214 (e.g., a record stored on records database 218) to be more contextually suitable/relevant to device 206 and device 208. For instance, device 206 or device 208 may determine from record 214, e.g., using record reader 230 and 232 respectively, whether data 212 is safe based on information specific to device 206 or device 208 respectively.

Having this data-centric system, local scan engine 224 on device 206 is now optional, and local scan engine 226 on device 208 is also optional. Cloud scan engine 216 (e.g., remote security scanner) is also optional as well, but may be provided to supplement information provided in record 214 (e.g., using global threat intelligence and/or other security scanners). The resulting system can advantageously leverage local scan engine 210 and record 214 to provide security at device 206 and device 208.

In some embodiments, device 204 transmits record 214 associated with data 212 along with data 212 from device 204 to device 206 and device 208. In some other embodiments, device 204 may transmit record 214 to a network resource (e.g., records database 218 of sharing service 202) that is accessible by device 206 and/or device 208 (e.g., using a record reader).

At the receiving end of data 212, device 206 and device 208 receive data 212 wherein the data file was previously scanned using a security scanner at the first device. Device 206 and/or device 208 (e.g., using a record reader and/or a file sharing client) may retrieve record 212 associated with data 212, and respective records 220 and 222 may be generated based on record 212 (e.g., using a record reader). Device 206 and device 208 can then render at least a part of record 220 and 222 the record for display to a user at the second device (e.g., using a record reader).

Figure 3:
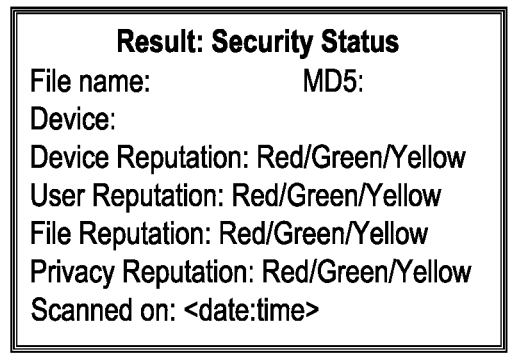
FIG. 3 is an illustration of a malware inspection metadata record according to one or more example embodiments of the present specification.

A record indicating security status/results according to one or more example embodiments of the present specification is provided in FIG. 3, and may include one or more of the following: an MD5 hash of the data file (or a hash of the data file and a part of the scanning data) so that the scanning data and results can be associated later when needed; information on the reputation of the user, reputation of the device, and reputation of the file; date or time stamp; and device name.

From the record, another device such as device 206 and device 208 (e.g., using a record reader) can deduce from the record (and generate a record of its own) whether data 212 is likely to be safe, without having to scan data 212 for the second time (the first time being the time when the originating device scanned the file and generated the record). Any scanning engine or security scanner may learn of typical platforms the data generated by the user is consumed on, and scan for those platforms. Results are aggregated whatever the engine deduces at the time.

Contextually-Relevant Information: Providing Context and Augmenting Record

An important aspect of the overall system is the ability to share the metadata record across devices. However, the metadata record may not always be optimally relevant to the device receiving and using the metadata record, due to the fact that the metadata record is generated by an originating device remote from the receiving device and the originating device does not necessarily have all the contextual information of the receiving device. Understanding that the scanner may not automatically scan a data file according to the context of the receiving device, or a record created or generated may not necessarily be contextually-relevant to the device receiving the record, the system may include one or more mechanisms to make the record more meaningful and contextually relevant to the receiving device.

In some embodiments, contextual-relevance refers to the need of the receiving device in the context of specific usage of the specified data on the specified system at a specific time. As an example, a user might want to read a PDF on a windows 7 (second) system at user's home with a specific Acrobat version on a specific date. In a device-centric security solution, the second device is expected to have a security solution installed that scans the PDF document to ensure safety on the second device. In the new mechanism, the receiving device can convey the context or contextual information to the originating device or a cloud service, which might a Windows 8.1 home server, which scans for safety of the specified PDF file in the context specified by the receiving device and let the receiving device know if the file is safe for the receiving device. With the new data and usage-centric mechanism, the receiving device obtained the benefit of having a local anti-malware solution by the virtue an anti-malware system in a known device (in this case the home server). Note that the originating and receiving device do not have to be related. It is possible for the devices with anti-malware local solution to publish their availability and for the devices without anti-malware local solution to discover availability of other systems that provide the solution.

It is possible for the receiving device to communicate to the originating device (device performing the security scan) the platform context and/or usage context, so that the originating device's security software scans to ensure the safety of the data in the receiving device's context. In one mechanism, contextual information of the receiving device is provided to the originating device or to a cloud service such that the record is generated or augmented according to the contextual information of the receiving device. This mechanism ensures that the originating device having the scanner is generating a record that is contextually-relevant for the receiving device. For instance, the receiving device can provide the platform information to the originating device (in some cases through a cloud service connected to the originating device and the receiving device), and the originating device can generate a record using a local scanner at the originating device according to the platform information of the receiving device.

Over time, the scanning engine can learn the typical platforms the receivers have and scan for those platforms a priori. The data-centric security system advantageously allows security scanners to be consolidated to fewer devices in the network. The management of security scanners becomes easier and in some cases, cheaper. This data-centric system would further allow devices to be protected from malware even when the device does not have a comparable security scanner or has no security scanner at all. Even though the scanners are not implemented on every device, typically harmful files spreading across the user community will be quickly caught with this mechanism. The present disclosure has applications beyond consumer scenarios. In an enterprise, where unmodified content tends to be circulated among the employees, the mechanism makes scanning on every device unnecessary.

Alternatively, a cloud service can adapt or retrieve a record that is contextually-relevant for the receiving device. In another instance, the receiving device can provide the platform information to the cloud service, and the cloud service can retrieve an appropriate record according to the platform information of the receiving device. As the data is shared, a copy of the results may be stored in a cloud service, for example, in sharing service 202 of FIG. 2. Sharing service 202 may generate links that are accessible by, e.g., device 206 and device 208 (or any other device, via a file sharing client and/or a record reader) for accessing the shared data. As the devices access the data, sharing service 202 may query platform information from device 206 and device 208, fetch appropriate results stored in the cloud service based on the platform information, and provide a contextually-relevant record to device 206 and 208.

In some embodiments, contextual-relevance relates to taking measures to adapt the record such that the record becomes more meaningful to the receiving device. If the record generated by the scanner is not contextually-relevant to the receiving device, the cloud service and/or the receiving device can still leverage the information by adapting or augmenting the record for the particular receiving device.

In one mechanism, a record reader at the receiving device can interpret the record according to the contextual information of the receiving device and presented to the user. These measures are particularly useful if the receiving device cannot provide contextual information to the originating device or the cloud service. In particular to the receiving device may interpret or adapt the record generated by the originating device in order to make the record contextually-relevant for the receiving device. For instance, if the metadata record shows that the scan was performed by a device having a virus definition file that is more recent than the virus definition file on the receiving device (the last updated date of the virus definition file at the receiving device being the contextual information of the receiving device), the record reader may indicate to the user that the scan was performed using a newer version of the virus definition file to make the record more relevant and meaningful to the user on the receiving device. In another example, if the receiving device has contextual information indicating that the receiving device trusts the originating device, even if the record does not show the file as being "trusted", the record reader may adapt the record to indicate to the user that the file is likely to be safe because of the contextual information at the receiving device (i.e., that the receiving device trusts the originating device).

According to one embodiment, the sharing service receives a record from a first device (the device which generated the record using a security scanner). The record is associated with a data file and comprises an identifier of the data file, a cryptographic hash of the data file, device information associated with the first device, scan information associated with the security scanner, user information associated with a user of the first device, and a time stamp of the record. The sharing service may query a second device to retrieve information associated with the second device and/or user information associated with a user of the second device. This information enables the sharing service to adapt the record into a record that is more contextually-relevant for the second device. The sharing service may then provide at least a part of the record or a derivation thereof to the second device based on the information associated with the second device and/or the user information associated with the user of the second device.

According to one embodiment, the receiving device receives a data file, wherein the data file was previously scanned using a security scanner at an originating device. The receiving device retrieves or receives a record associated with the data file, wherein the record comprises: an identifier of the data file, a cryptographic hash of the data file, device information associated with the originating device, scan information associated with the security scanner, user information associated with a user of the originating device, and a time stamp of the record. The receiving device may render at least a part of the record or a derivation thereof for display to a user at the receiving device. In particular, the receiving device may use (contextual) information associated with the receiving device and/or a user information associated with a user of the receiving device.

If the data file was not scanned for the receiving device, the cloud service may optionally scan for the receiving device. The record stored on the cloud service may be updated as the file changes and the status updates are broadcast to devices that accessed the data in the past.

User Interface for Displaying the Record

Figure 4:
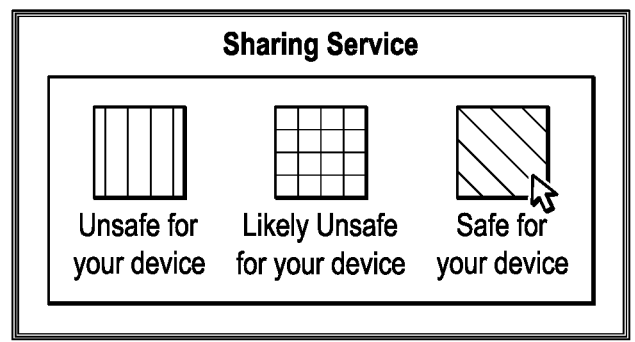
FIG. 4 is an illustration of a user interface element according to one or more example embodiments of the present specification.

As the devices access the data, sharing service 202 may query for platform information associated with device 206 and device 208, fetch results data, and present a contextually-relevant user interface such as the one shown in FIG. 4, which discloses a user interface element in accordance with one or more example embodiments of the present disclosure.

The user interface or user interface element displaying the record or a derivation of the record preferably include one or more graphical parts which indicate to the user whether the file is "unsafe for your device", "likely unsafe for your device", or "likely safe for your device" (or any reasonable variations on these examples). In some embodiments, the data in the record is displayed in text form. In some embodiments, the data in the record is displayed using indicators (e.g., red/yellow/green) which abstracts the information in the record to enable the user to more easily understand the meaning of the security information of the record.

According to one aspect, the receiving device provides a first user interface element indicating an overall level of safety of the data file for the second device, wherein the overall level of safety is determined based on one or more of the following: cryptographic hash of the data file, the device information, the scan information, the user information, and the privacy information. The sharing service or the receiving device may determine the overall level of safety of the data file for the second device based further on device information associated with the second device and/or user information associated with a user of the second device.

This overall level of safety may be determined using any suitable algorithms which takes into account various information provided in the record and preferably information associated with the second device and/or user information associated with a user of the second device. For instance, the level of safety for is higher (safer) if the record indicates that the originating device is a highly reputable device. In another instance, the level of safety is higher if the record indicates that the originating device and the receiving device belong to the same organization. In yet another instance, the level of safety is lower if the record indicates that the scan was performed too long ago (e.g., over a year ago).

The user interface may optionally expand to provide details on reputations along user, device, privacy, and file reputation. Suitable user interface elements may display one or more of the following: a device reputation indicator determined based on the device information associated with the first device, a user reputation indicator determined based on the user information associated with the user of the first device; a file reputation indicator determined based on the cryptographic hash and the scan information; and a privacy reputation indicator determined based on the privacy information and user information associated with the user of the second device.

Privacy Information in the Record

Scanners today do not in general focus on privacy. However, stealing the private information has become a key exploitation especially on modern form factors such as smartphones. As the data travels between devices, it is critical that the data is scanned for presence of private information to enable appropriate actions to be taken. The actions could include, but not limited to, encryption of the file on the local system and during transmission, enforcing backup policies, enforcing logging at the server on who has accessed the data and how many times, prevention of storage of data on cloud services, so on. A scanner or a cloud service can detect privacy problems based on privacy information provided by the originating device and provide a privacy reputation as part of the record as the record travels with the data. For instance, a user on an originating devices who always encrypts data and implements many policies for protecting privacy on the originating device may have a higher privacy reputation than the privacy reputation of a public device with minimal amount of privacy protection policies.

Prevention of data leakage, such as private data, has become just as important as malware detection. The data being transmitted will have associated privacy information in the record, such that a receiving device can perform local behavioural and heuristic analysis on the privacy information. Potential violation of privacy rules may result in appropriate handling of the data such as encrypting the data, and advice on risks of storing sensitive information, etc. For example, a privacy scanner on an originating device may detect private financial information in the data file, e.g., social security number and/or bank account number of the user of the originating device. This privacy information may be provided as part of the record such that the receiving device or a cloud service can be informed of any privacy risks.

Figure 5:
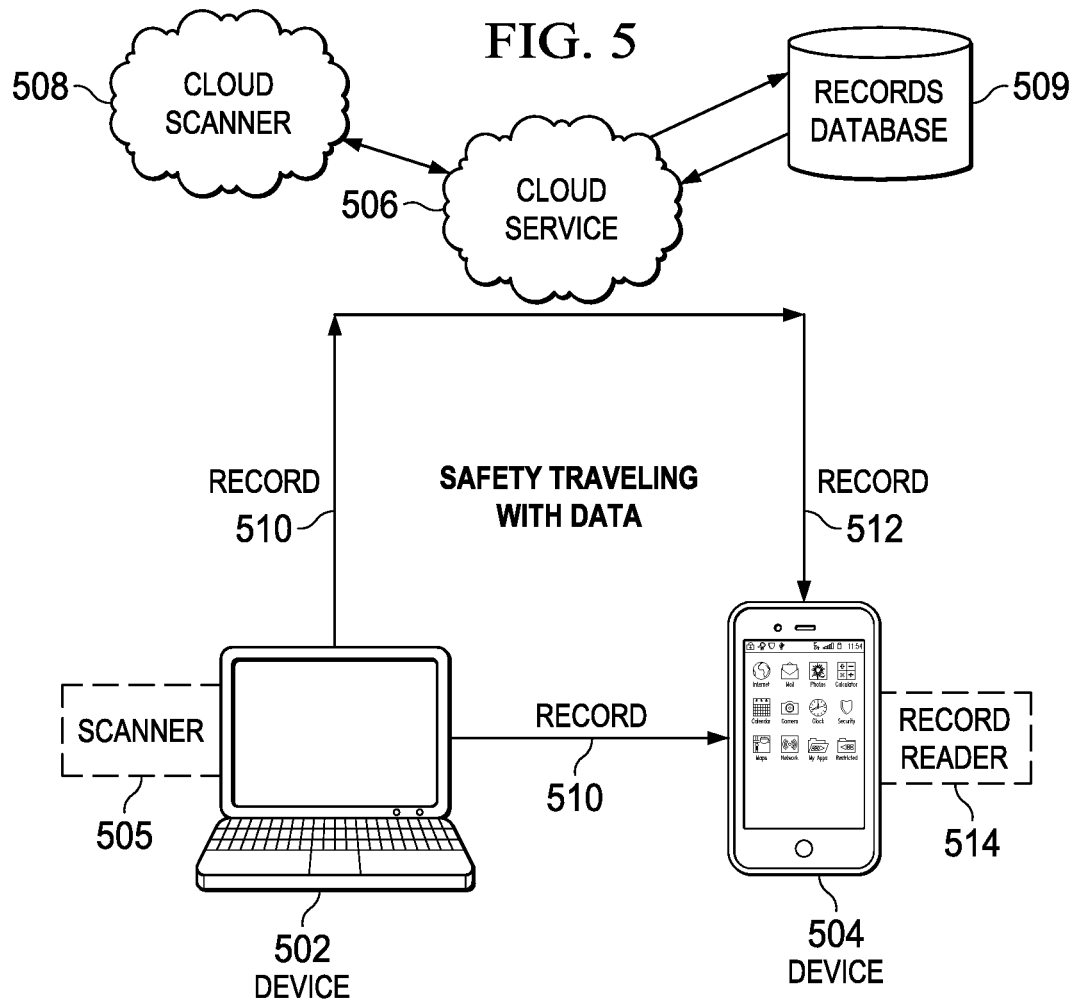
FIG. 5 is a block diagram illustrating safety traveling with data, according to some embodiments of the present specification.

Security/Safety Travels with Data for Peer-to-Peer and Cloud Service and Systems The present disclosure envisions both types of data and record sharing: cloud sharing and peer-to-peer sharing. In both cases, because the record is tied to the data, no matter how the data, the file, or the record is shared among devices, the receiving devices can still identify the record associated with the data. FIG. 5 is a block diagram illustrating safety traveling with data, according to some embodiments of the present specification, for both the cloud service system and the peer-to-peer system.

In the peer-to-peer system, device 502 scans a data file using a (local) scanner 505, and provides the record 510 over a network to device 504 remote from device 502. In the cloud service system, a cloud service 506 is provided which allows device 502 and device 504 to access data files and records stored in records database 509 (e.g., provided on non-transitory computer-readable medium). Optionally, the cloud service has cloud scanner 508. When device 502 scans a file using scanner 505, record 510 is provided to cloud service 506. The cloud service 506 may advantageously augment record 510 using scan results from cloud scanner 508 to provide added security. The cloud service 508 may augmenting record 510 using scan results from cloud scanner 508 to generate record 512. Record 510 and/or record 512 is stored in records database 509, and made accessible to device 504. Device 504 has file sharing client and/or a record reader 514 (e.g., as a part of a security client, but does not necessarily have a file scanner) for receiving and/or interpreting record 512 and/or record 510. Record reader 514 preferably can generate user interface elements to provide the information in the record to the user.

The cloud service architecture may have an extra advantage whereby the record can be kept up to date if a cloud service includes a synchronization mechanism for maintaining the record and receiving updates to the record. The devices may then access the most up-to-date record when needed.

Exemplary Screenshots

Figure 6:
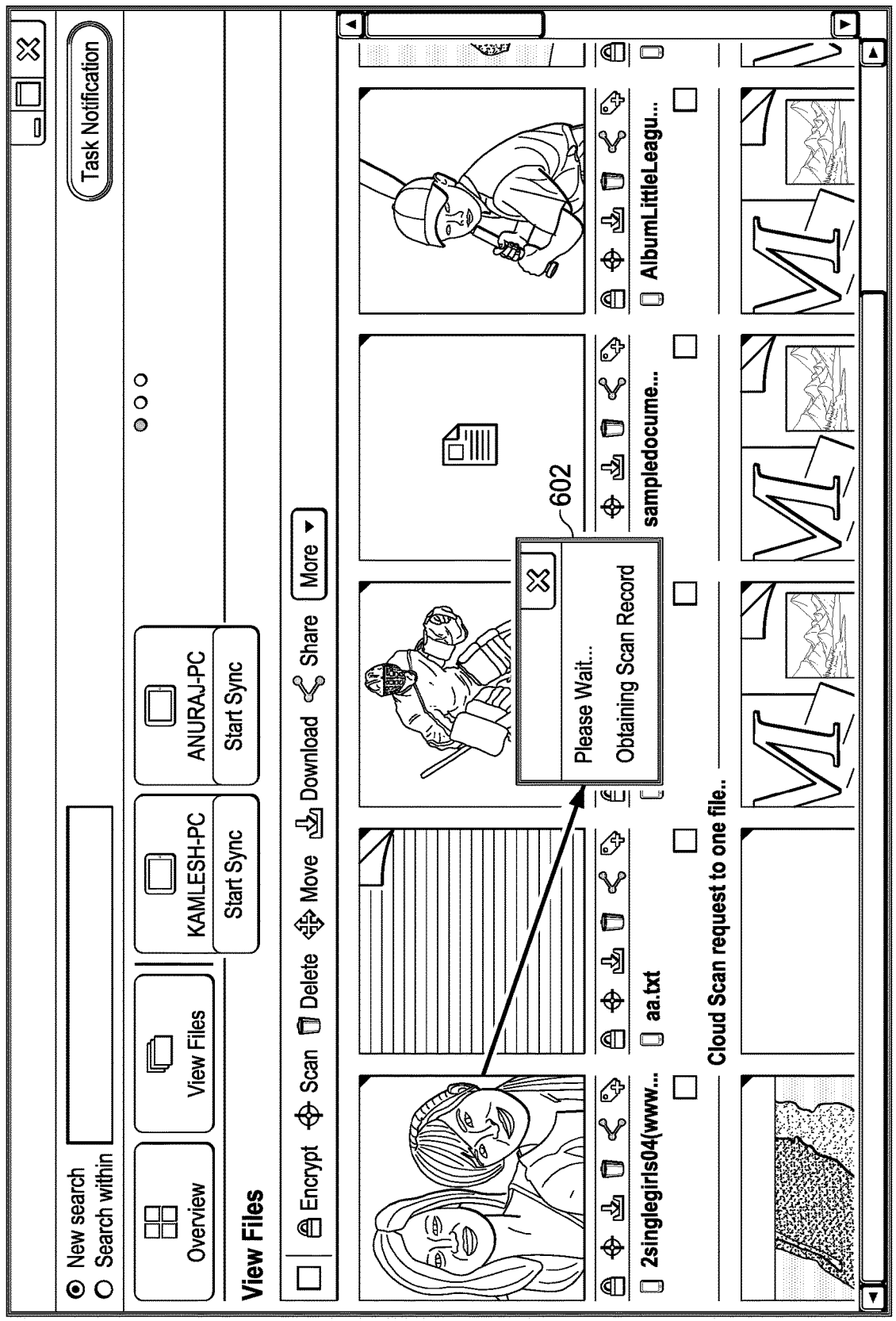
FIGS. 6-7 show illustrative screenshots of retrieving data-centric metadata record for a data file, according to some embodiments of the present specification.
Figure 7:
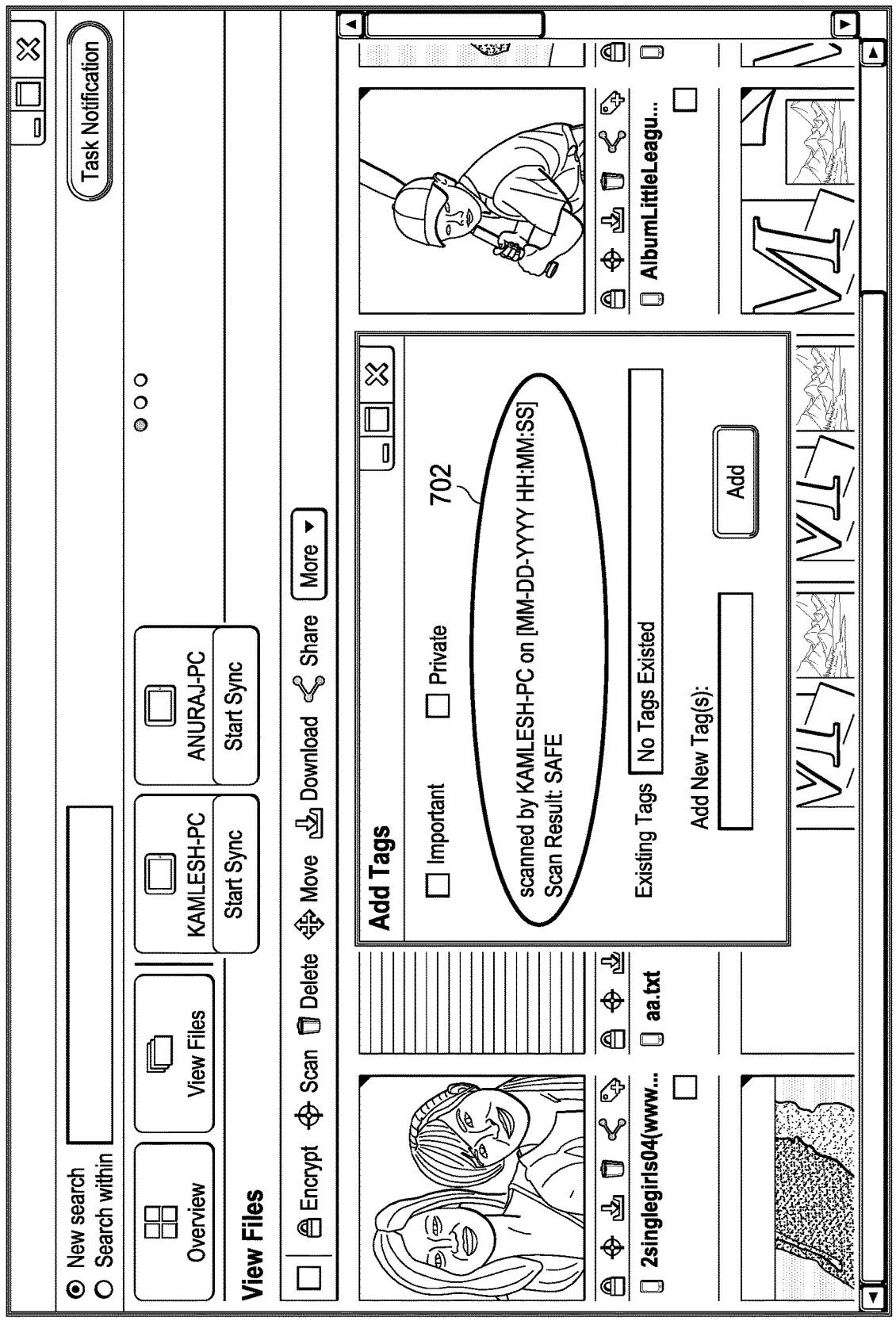

FIGS. 6-7 show illustrative screenshots of retrieving data-centric metadata record for a data file, according to some embodiments of the present specification. The screenshot in FIG. 6 shows a user interface on a user device where a user can browse through a plurality of files (e.g., files stored remotely on a cloud, or on other devices such as "KAMLESH-PC" and "ANURAJ-PC"). Using the user interface, the user can select an option to obtain a record associated with a data file, which provides some security information to the user about the data file without having to run a scan on the files using the device. The screen shot of FIG. 6 shows a message 602 "PLEASE WAIT . . . OBTAINING SCAN RECORD . . . " to indicate to the user that the record associated with the data file is being fetched, e.g., from a records database using a file sharing client and/or a record reader at the device.

Once the file sharing client and/or the record reader retrieves the record for the data file, at least a part of the record and/or a derivation thereof is rendered for display to the user through the user interface. The screenshot of FIG. 7 shows a user interface element having a message 702 "SCANNED BY KAMLESH-PC ON [MM-DD-YYYY HH:MM:SS] SCAN RESULT: SAFE". Advantageously, the scan results from "KAMLESH-PC" is leveraged for determining whether the data file is likely to be safe.

Reputation Analysis: Aggregation of Reputation Information

One of the important features of the present disclosure is the provision of reputation information to a user of the receiving device. The reputation information is valuable in allowing a user of the receiving device to determine whether the data file and the record having information generated by another device can be trusted with confidence. This reputation information may take into account the reputation of the originating device and/or the user of the originating device. In some cases, the reputation is supplemented by reputation information provided by a cloud (e.g., a cloud service and/or a cloud scanner). The combination of various reputation information provides a robust record for a file that a user of the receiving device can trust with confidence, even though the receiving device does not have a scanner or security system, or has not scanned the file.

The reputation of a file traditionally based on a cloud service maintaining a record of all black-listed content in the internet. With this, the system when queried can provide reputation of the file when the file arrives at a user's system as in a download of an application from the internet. Although this is an extremely powerful mechanism, but has limitations. A bulk of the content exchanged between users across the internet is user generated, and the current mechanism will not be able to classify the user generated content as black-listed or white-listed.

In one example embodiment, the reputation analysis of the present specification is performed by an antivirus program or other associated agents and services (e.g., a cloud service, a cloud scanner, a record reader at a receiving device). An aggregate reputation may comprise multiple dimensions of reputation. These agents and services may provide malware scanning and provide results on whether a file is virus, Trojan, potentially unwanted file, or other type of malware. Other relevant information is whether the scan is performed for which platform (Windows/Linux/Android/Mac/iOS), virus definition file (DAT) version used, scanned by which client/service etc. Yet other relevant information is whether the user of the originating device has a good reputation or a bad reputation.

Figure 8:
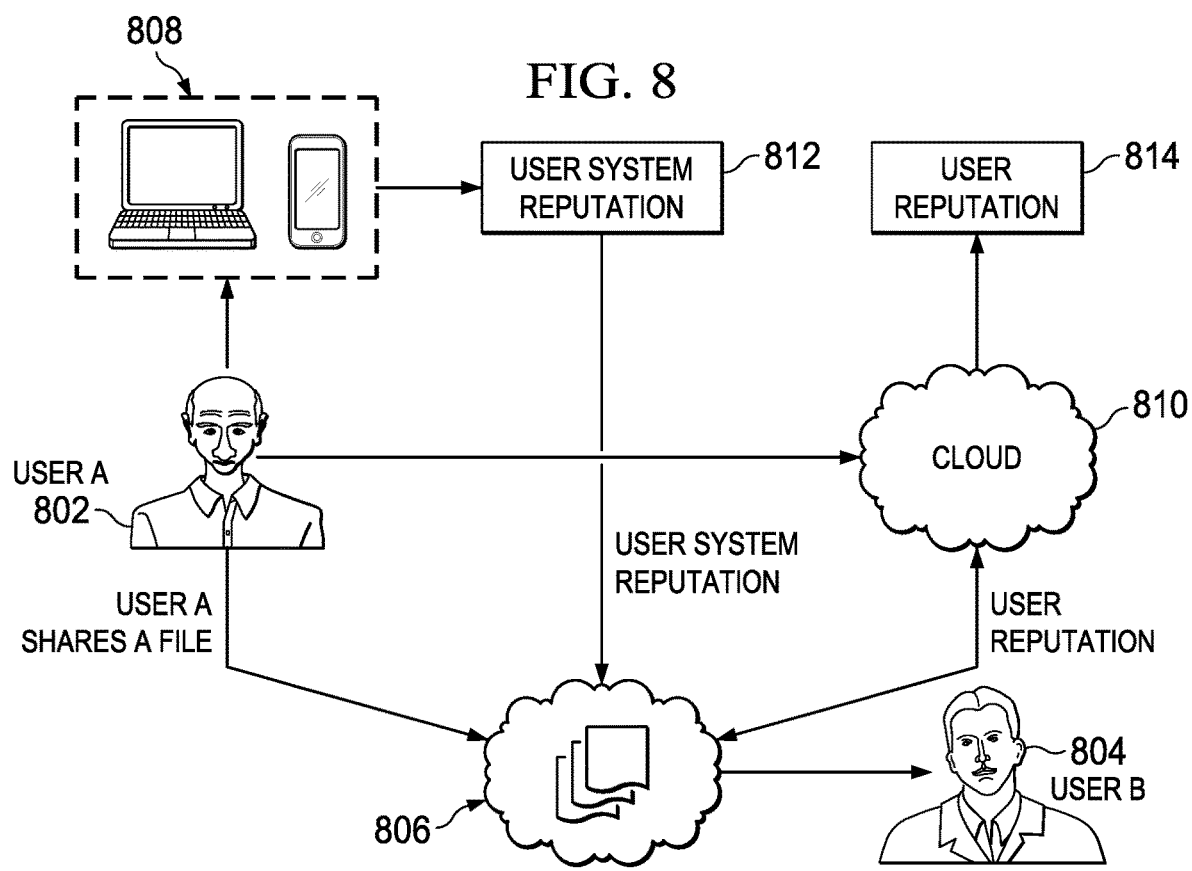
FIG. 8 is a block diagram illustrating an aggregate reputation of a data file, according to some embodiments of the present specification.

FIG. 8 is a block diagram illustrating an aggregate reputation of a data file, according to some embodiments of the present specification. Specifically, a reputation analysis method determines the aggregate reputation (in some cases conveying an "overall level of safety" for a particular file) based on several factors. In this example, user A 802 shares file 806 with user B 804. User A 802 uses device 808, and device 808 may be provisioned with a scanner. Furthermore, user A 802 may share file 806 though a cloud service with user B 804. In the present disclosure, three dimensions of reputations are used for judging whether file 806 is safe for a receiving device: a) file reputation, b) user system reputation ("also referred to as "device reputation"), and c) user reputation for each transaction or sharing of data occurring among the users of the system.

The file reputation is determined by a security scanner and is based on whether the file is a known good file (1.0) or bad (0.0). File reputation has to conservatively treat the unknown as bad (0.0). User A 802 may determine file reputation using a scanner on device 808. In some cases, cloud 810 (a cloud service and/or a cloud scanner) may also determine file reputation. File reputation can be determined using any suitable security scanner.

User system reputation 812 ("device reputation") is based on device information provided by user A 802 (i.e., information on the configuration of the originating device). For instance, if the originating device runs on a Windows platform, the device reputation is derived from the version of the virus definition file, when the anti-malware was last updated, etc. The originating device may provide device information such as the version of the virus definition file, version of the malware-scanner at the originating device, etc. for determining user system reputation 812. In some cases, cloud 810 may also determine user system reputation. User system reputation may be determined based on one or more of the following (e.g., via a combination of the following parameters, where each parameter is assigned a 0 or 1, or combined using a simple or weighted average of scores for each parameter).

Device boot status: the device where the file originated was booted through known sequence of secure boot operations, secure boot;

Security scanner: presence of a security scanner on the device, the status of the last scan (if the last scan was clean, probability is high that the file being sent is clean of malware; the presence and operation of a security sensor, in fact, abstract several underlying reputations and helps to build trust in the data being shared);

File origin: whether the file was user generated;

Physical user: if a physical user was present on the system at the time of data transfer;

Device authentication: affirms if the access to the device was secured and how, PIN/Pattern/Biometric;

Communication: attests the communication originates from the device;

Sandbox: attests that while transaction in progress no other application/process is eavesdropping and communication solely to the intended recipient;

Patch level of the platform; and

Reputation of all the applications installed: between two Windows 7 computers, one which has applications with poorer reputation installed is less reputed than the other (accordingly, the two computers may have different levels of device reputation).

User reputation 814 is determined based on user information of user A 802 provided by user A 802. Using the user information, cloud 810 can determine user reputation 814 based on a history associated with the user, such as a history stored in cloud 810. The history may include: number of files shared so far, number of good files shared so far, number of bad files shared so far, user activity, etc. User reputation 814 may be determined by cloud 810 using one or more of the following parameters (e.g., via a combination of the above parameters, such as assigning each parameters is assigned a 0 or 1, or combined using a simple/weighted average):

Has known identity or not;

Has identity associated with membership of the service;

On system with known system reputation or not;

Number of bad files shared (may have a relatively high weight, parameter may be based on on how long ago the bad file was shared by the user);

Number of good files shared or number of total files shared; and

Whether system has captured user activity linking to suspicious URLs/content.

With the combination of the three reputations ("final reputation=file reputation+user system reputation+user reputation"), user B 804 at the receiving device would be in a better position to decide on plausible action with a file of unknown reputation. This reflects the typical user behaviour today. If a co-worker shares a file through an enterprise provide USB drive or share, we implicitly trust that as against the file shared by a co-passenger, as an example. This is because the implicit trust on a co-worker in work environment is higher than relative stranger.

Figure 9:
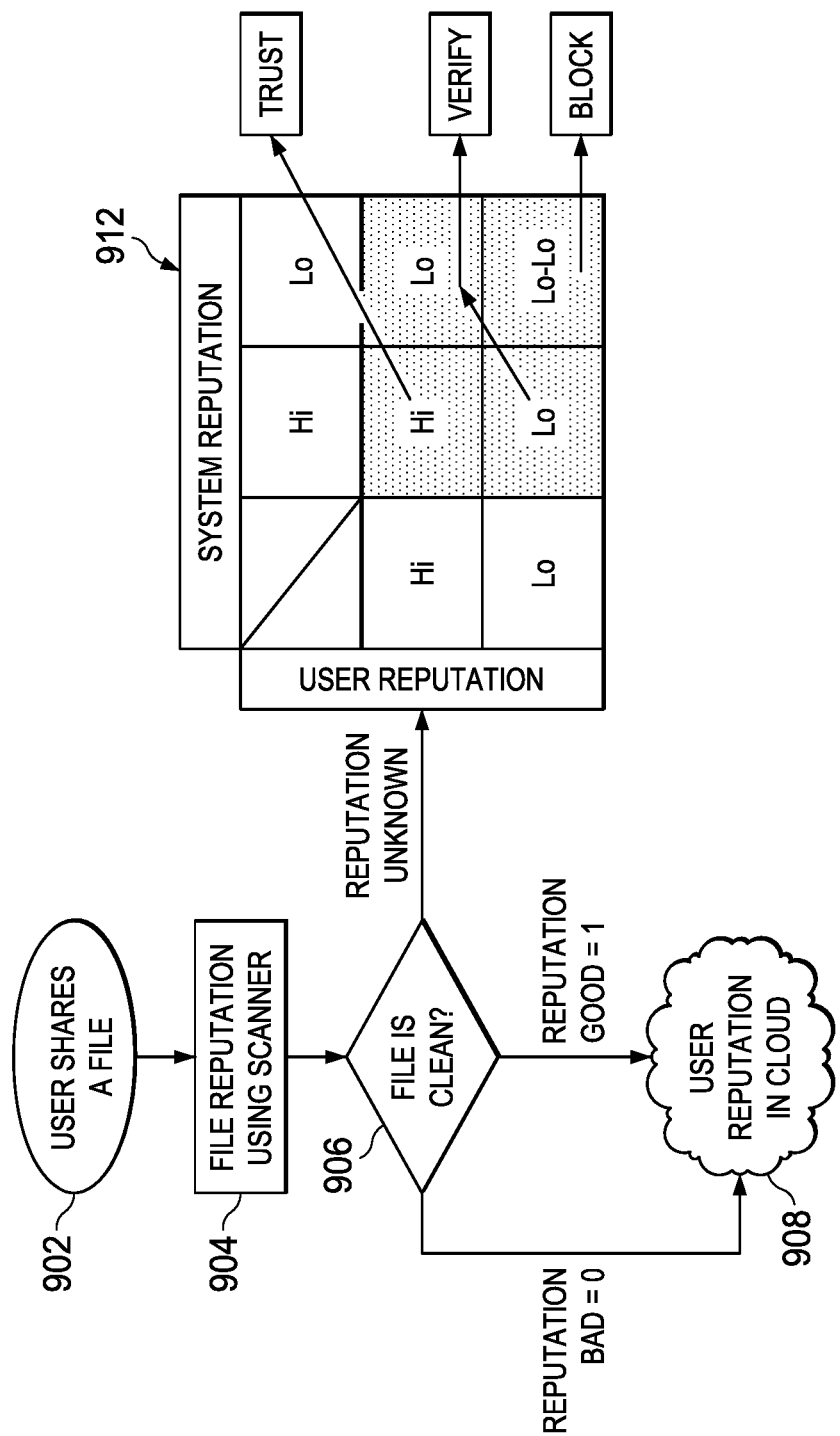
FIG. 9 is a block diagram illustrating analysis of reputation information for a data file, according to some embodiments of the present specification.

FIG. 9 is a block diagram illustrating analysis of reputation information for a data file, according to some embodiments of the present specification. The analysis of reputation information can be an important part of providing an overall level of safety for a particular data file. At box 902, a user of an originating device shares a file 902 with another user or to a cloud service. At box 904, the originating device may determine the file reputation using a scanner at the originating device. In some cases, this file reputation is determined at a cloud scanner. At box 906, a cloud service, a cloud scanner, or a record reader at a receiving device determines whether the file is clean/safe based on the results from box 906. At this point, there are three possible outcomes: "file reputation BAD", "file reputation GOOD", or file reputation UNKNOWN.

The outcome of "file reputation BAD", "file reputation GOOD" is provided as part of the record, and in some cases, provided to the cloud (shown as user representation in cloud 908) as part of a history of the user. If the outcome is "file reputation UNKNOWN", the reputation analysis can perform further analysis, e.g., using table 912, based on user reputation and (user) system reputation. This enables an overall level of safety to be derived even if the file reputation is unknown. For instance, if the user reputation is high and the system reputation is high, the reputation analysis may consider the data file to be trusted. If the user reputation is low and the system reputation is low, the reputation analysis may consider the data file to be untrusted and thus should be blocked from being shared. If the user reputation is low but the system reputation is high or the user reputation is high but the system reputation is low, the reputation analysis may consider the data file to be a candidate for further verification (e.g., by some other scanner).

Pushing Scan Requests to Originating Device

Figure 10:
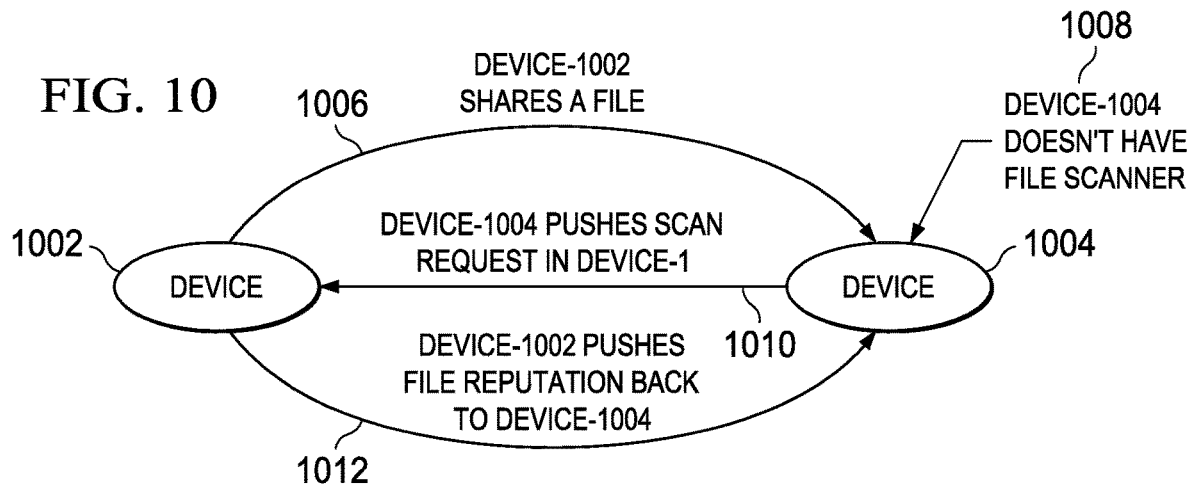
FIG. 10 is a block diagram illustrating a method for providing security across multiple devices, according to some embodiments of the present specification.

FIG. 10 is a block diagram illustrating a method for providing security across multiple devices, according to some embodiments of the present specification. An originating device 1002 shares a file with receiving device 1004 (item 1006). However, the receiving device 1004 does not have an appropriate file scanner for scanning the data file (item 1008). The receiving device 1004 may have discovered that the originating device 1002 has the appropriate scanner for scanning the data file for the context of receiving device 1004. Accordingly, the receiving device 1004 pushes a scan request to originating device 1002 (item 1010) to request a scan of the data file, and optionally provide some contextual information of the second device. The originating device 1002, in response, scans the data file and generates a record. Then, according to the concept of security travels with data, the originating device 1002 provides the record (including file reputation) to receiving device 1004 (item 1012).

System Illustrations

Figure 11:
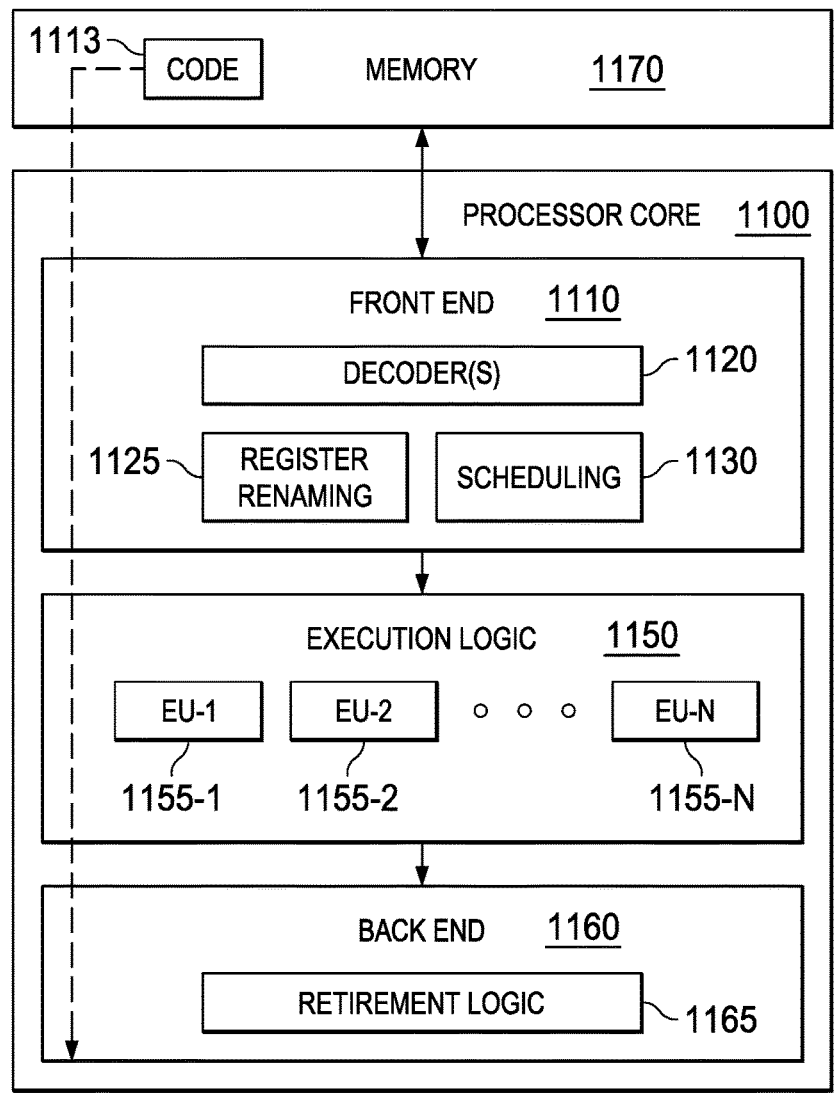
FIG. 11 is a block diagram of a memory coupled to an example processor according to an embodiment.

FIG. 11 is a block diagram of a memory coupled to an example processor according to an embodiment. FIG. 11 illustrates a processor core 1100 according to one embodiment. Processor core 1100 may be the core for any type of processor, such as a microprocessor, an embedded processor, a digital signal processor (DSP), a network processor, or other device to execute code. Although only one processor core 1100 is illustrated in FIG. 11, a processing element may alternatively include more than one of the processor core 1100 illustrated in FIG. 11. (See, e.g., multi-core embodiments in FIG. 12, below). Processor 1100 may be any type of processor, such as a microprocessor, an embedded processor, a digital signal processor (DSP), a network processor, a multi-core processor, a single core processor, or other device to execute code. Processor core 1100 may be a single-threaded core or, for at least one embodiment, the processor core 1100 may be multithreaded in that it may include more than one hardware thread context (or "logical processor") per core. Such cores 1100 may be configured to execute instruction code in a manner disclosed herein. This system shown in FIG. 11 may be used to carry out the functions describe herein to be performed by e.g., devices, file sharing client, sharing service (system), cloud service, cloud scanner, scan engines, security scanner, record reader, and any components shown in FIGS. 1, 2, 5, 8, and 10 for enabling data-centric computer security.

FIG. 11 also illustrates a memory 1170 coupled to the processor 1100. The memory 1170 may be any of a wide variety of memories (including various layers of memory hierarchy) as are known or otherwise available to those of skill in the art. The memory 1170 may include one or more code instruction(s) 1113 to be executed by the processor 1100 core. The processor core 1100 follows a program sequence of instructions indicated by the code 1113. Each instruction enters a front end portion 1110 and is processed by one or more decoders 1120. The decoder may generate as its output a micro operation such as a fixed width micro operation in a predefined format, or may generate other instructions, microinstructions, or control signals which reflect the original code instruction. The front end 1110 also includes register renaming logic 1125 and scheduling logic 1130, which generally allocate resources and queue the operation corresponding to the convert instruction for execution.

The processor 1100 is shown including execution logic 1150 having a set of execution units 1155-1 through 1155-N. Some embodiments may include a number of execution units dedicated to specific functions or sets of functions. Other embodiments may include only one execution unit or one execution unit that can perform a particular function. The execution logic 1150 performs the operations specified by code instructions.

After completion of execution of the operations specified by the code instructions, back end logic 1160 retires the instructions of the code 1113. In one embodiment, the processor 1100 allows out of order execution but requires in order retirement of instructions. Retirement logic x65 may take a variety of forms as known to those of skill in the art (e.g., re-order buffers or the like). In this manner, the processor core 1100 is transformed during execution of the code 1113, at least in terms of the output generated by the decoder, the hardware registers and tables utilized by the register renaming logic 1125, and any registers (not shown) modified by the execution logic 1150.

Although not illustrated in FIG. 11, a processing element may include other elements on chip with the processor core 1100. For example, a processing element may include memory control logic (see, e.g., MC 1272 of FIG. 12, below) along with the processor core 1100. The processing element may include I/O control logic and/or may include I/O control logic integrated with memory control logic. The processing element may also include one or more caches.

Figure 12:
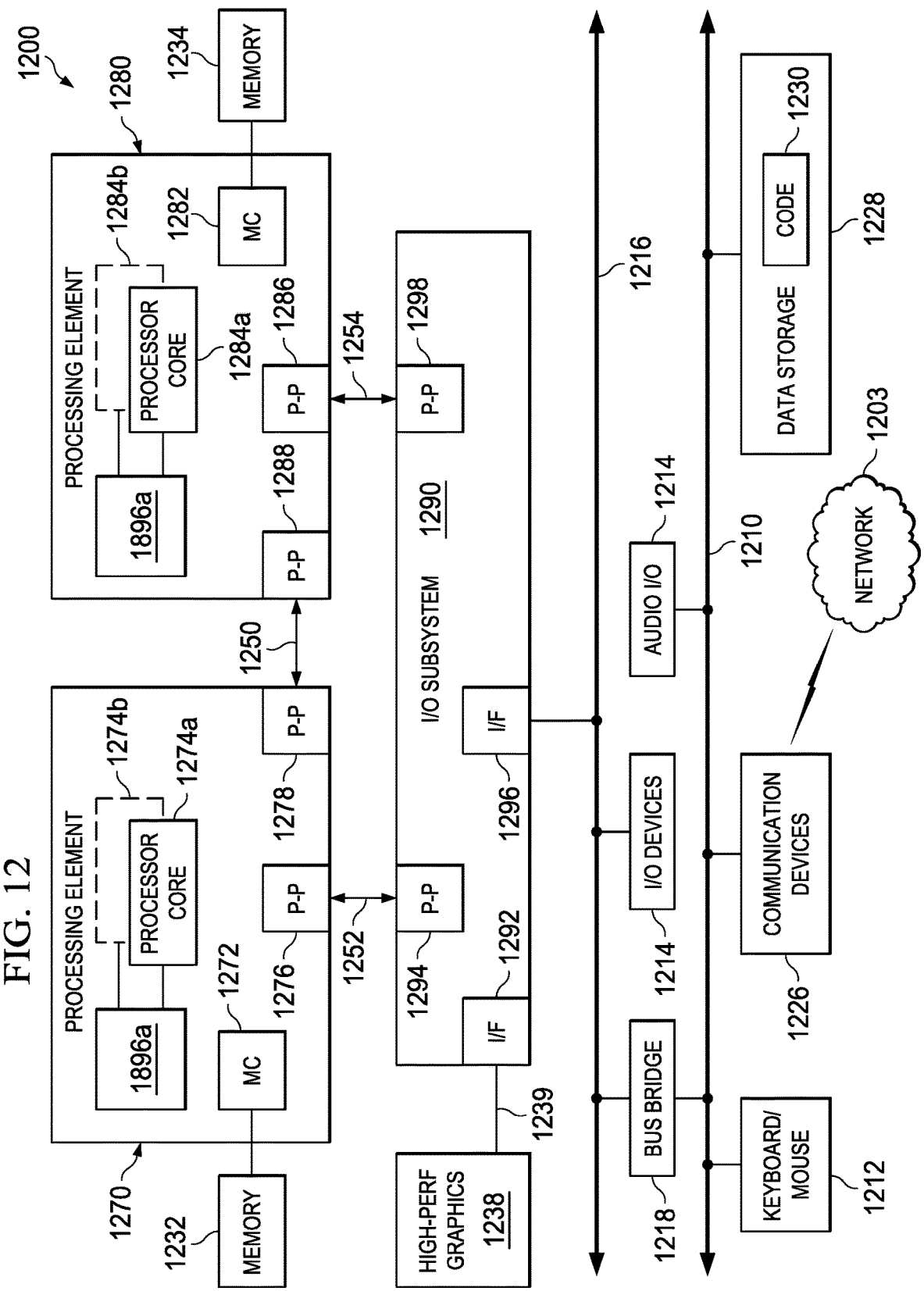
FIG. 12 is a block diagram of an example computing system that is arranged in a point-to-point (PtP) configuration according to an embodiment.

FIG. 12 is a block diagram of an example computing system that is arranged in a point-to-point (PtP) configuration according to an embodiment. Shown in FIG. 12 is a multiprocessor system 1200 that includes a first processing element 1270 and a second processing element 1280. While two processing elements 1270 and 1280 are shown, it is to be understood that an embodiment of system 1200 may also include only one such processing element. This system shown in FIG. 12 may be used to carry out the functions describe herein to be performed by e.g., devices, file sharing client, sharing service (system), cloud service, cloud scanner, scan engines, security scanner, record reader, and any components shown in FIGS. 1, 2, 5, 8, and 10 for enabling data-centric computer security.

System 1200 is illustrated as a point-to-point interconnect system, wherein the first processing element 1270 and second processing element 1280 are coupled via a point-to-point interconnect 1250. It should be understood that any or all of the interconnects illustrated in FIG. 12 may be implemented as multi-drop bus rather than point-to-point interconnect.

As shown in FIG. 12, each of processing elements 1270 and 1280 may be multicore processors, including first and second processor cores (i.e., processor cores 1274a and 1274b and processor cores 1284a and 1284b). Such cores 1274, 1274b, 1284a, 1284b may be configured to execute instruction code in a manner disclosed herein.

Each processing element 1270, 1280 may include at least one shared cache 1896. The shared cache 1896a, 1896b may store data (e.g., instructions) that are utilized by one or more components of the processor, such as the cores 1274a, 1274b and 1284a, 1284b, respectively. For example, the shared cache may locally cache data stored in a memory 1232, 1234 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1270, 1280, it is to be understood that the scope of the present invention is not so limited. In other embodiments, one or more additional processing elements may be present in a given processor. Alternatively, one or more of processing elements 1270, 1280 may be an element other than a processor, such as an ASIC chip or a field programmable gate array. For example, additional processing element(s) may include additional processors(s) that are the same as a first processor 1270, additional processor(s) that are heterogeneous or asymmetric to processor a first processor 1270, accelerators (such as, e.g., graphics accelerators or digital signal processing (DSP) units), field programmable gate arrays, or any other processing element. There can be a variety of differences between the processing elements 1270, 1280 in terms of a spectrum of metrics of merit including architectural, microarchitectural, thermal, power consumption characteristics, and the like. These differences may effectively manifest themselves as asymmetry and heterogeneity amongst the processing elements 1270, 1280. For at least one embodiment, the various processing elements 1270, 1280 may reside in the same die package.

First processing element 1270 may further include memory controller logic (MC) 1272 and point-to-point (P-P) interfaces 1276 and 1278. Similarly, second processing element 1280 may include a MC 1282 and P-P interfaces 1286 and 1288. As shown in FIG. 12, MC's 1272 and 1282 couple the processors to respective memories, namely a memory 1232 and a memory 1234, which may be portions of main memory locally attached to the respective processors. While MC logic 1272 and 1282 is illustrated as integrated into the processing elements 1270, 1280, for alternative embodiments the MC logic may be discrete logic outside the processing elements 1270, 1280 rather than integrated therein.

First processing element 1270 and second processing element 1280 may be coupled to an I/O subsystem 1290 via P-P interconnects 1276, 1286 and 1284, respectively. As shown in FIG. 12, I/O subsystem 1290 includes P-P interfaces 1294 and 1298. Furthermore, I/O subsystem 1290 includes an interface 1292 to couple I/O subsystem 1290 with a high performance graphics engine 1238. In one embodiment, bus 1249 may be used to couple graphics engine 1238 to I/O subsystem 1290. Alternately, a point-to-point interconnect 1239 may couple these components.

In turn, I/O subsystem 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which may couple first bus 1216 to a second bus 1210. In one embodiment, second bus 1220 may be a low pin count (LPC) bus. Various devices may be coupled to second bus 1220 including, for example, a keyboard/mouse 1212, communication device(s) 1226 (which may in turn be in communication with the computer network 1203), and a data storage unit 1228 such as a disk drive or other mass storage device which may include code 1230, in one embodiment. The code 1230 may include instructions for performing embodiments of one or more of the methods described above. Further, an audio I/O 1224 may be coupled to second bus 1220.

Note that other embodiments are contemplated. For example, instead of the point-to-point architecture of FIG. 12, a system may implement a multi-drop bus or another such communication topology. Also, the elements of FIG. 12 may alternatively be partitioned using more or fewer integrated chips than shown in FIG. 12.

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, the data-centric computer security systems are readily scalable and can be implemented across a large number of components, as well as more complicated/sophisticated arrangements and configurations. Accordingly, the examples provided should not limit the scope or inhibit the broad teachings of data-centric computer security as potentially applied to a myriad of other architectures.

It is also important to note that the functions related to data-centric computer security systems as disclosed herein, illustrate only some of the possible data-centric computer security functions that may be executed by, or within, systems illustrated in the FIGS. 1, 2, 5, 8, and 10-12. Some of these operations (e.g., in relation to all the FIGURES) may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although systems in FIGS. 1, 2, 5, 8, and 10-12 have been illustrated with reference to particular elements and operations that facilitate the data-centric computer security functions, these elements and operations may be replaced by any suitable architecture, protocols, and/or processes that achieve the intended functionality of the data-centric computer security system.

In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the systems and devices (e.g., devices, file sharing client, sharing service (system), cloud service, cloud scanner, scan engines, security scanner, record reader, and any components shown in FIGS. 1, 2, 5, 8, and 10 for enabling data-centric computer security.) disclosed herein may also include a memory device (or memory element) for storing information to be used in achieving the functions as outlined herein. Additionally, the systems and devices (e.g., devices, file sharing client, sharing service (system), cloud service, cloud scanner, scan engines, security scanner, record reader, and any components shown in FIGS. 1, 2, 5, 8, and 10 for enabling data-centric computer security) described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in any of the figures/drawings included herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element is provided to store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It should be noted that much of the infrastructure discussed herein (e.g., devices, file sharing client, sharing service (system), cloud service, cloud scanner, scan engines, security scanner, record reader, and any components shown in FIGS. 1, 2, 5, 8, and 10 for enabling data-centric computer security) can be provisioned as part of any type of network element. As used herein, the terms e.g., devices, file sharing client, sharing service (system), scan engines, record reader, security scanner, and any components shown in FIGS. 1, 2, 5, 8, and 10 for enabling data-centric computer security can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices (e.g., devices, sharing service (system), file sharing client, record reader, scan engines, security scanner, and any components shown in FIGS. 1, 2, 5, 8, and 10 having network connectivity or communication channel with another component) can include software to achieve (or to foster) the concept of data-centric computer security. This could include the implementation of instances of any of the components, engines, logic, etc. shown in the diagrams included herein. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the data-centric computer security activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the figures/drawings included herein (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signalling scenarios and patterns that may be executed by, or within, communication systems shown in the figures/drawings included herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures/drawings in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In accordance with the well-established principle that an "applicant is entitled to be his or her own lexicographer," MPEP 2111.01(W), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

The following examples pertain to some embodiments of the disclosure.

Example 1 is at least one machine readable non-transitory storage medium having instructions stored thereon for providing data-centric computer security between a first device and a second device remote from the first device, wherein the instructions when executed by at least one processor cause the at least one processor to perform the following operations: scanning a data file using a security scanner at the first device; creating a record associated with the data file based in part on results from the security scanner, the record comprising: an identifier of the data file, a cryptographic hash of the data file, device information associated with the first device, scan information associated with the security scanner, user information associated with a user of the first device, and a time stamp of the record; and making the record accessible by the second device.

In Example 2, the subject matter of Example 1 can optionally include: scanning the data file for malware contextually relevant to the second device based on contextual information received from the second device.

In Example 3, the subject matter of Example 1 or 2 can optionally include: the device information comprising at least one of: reputation of the device, identifier of the security software, version of the security software; and operating system platform version.

In Example 4, the subject matter of any one of the Examples 1-3 can optionally include: the scan information comprising at least one of: scan status or results, scan parameters, and target platforms for which the security scanner scanned.

In Example 5, the subject matter of any one of the Examples 1-4 can optionally include: the user information comprising at least one of: reputation of the user of the first device, and the manner in which the user of the first device is linked to a user of the second device.

In Example 6, the subject matter of any one of the Examples 1-5 can optionally include: the record further comprising privacy information comprising at least one of: privacy reputation of a user of the first device, and the manner in which the user of the first device is linked to a user of the second device.

In Example 7, the subject matter of any one of the Examples 1-6 can optionally include: making the record accessible by the second device comprising transmitting the record associated with the data file along with the data file from the first device to the second device.

In Example 8, the subject matter of any one of the Examples 1-6 can optionally include making the record accessible by the second device comprising transmitting the record associated with the data file to a network resource, wherein the network resource is accessible by the second device.

Example 9 is at least one machine readable non-transitory storage medium having instructions stored thereon for providing data-centric computer security between a first device and a second device remote from the first device, wherein the instructions when executed by at least one processor cause the at least one processor to perform the following operations: receiving a record at a sharing service system from the first device, wherein the record is associated with a data file and comprises an identifier of the data file, a cryptographic hash of the data file, device information associated with the first device, scan information associated with the security scanner, user information associated with a user of the first device, and a time stamp of the record; querying the second device to retrieve information associated with the second device and/or user information associated with a user of the second device; and providing at least a part of the record or a derivation thereof to the second device based on the information associated with the second device and/or the user information associated with the user of the second device.

In Example 10, the subject matter of Example 9 can optionally include: augmenting the record, before providing the record to the second device, with user reputation information determined based on a history associated with the user of the first device.

Example 11 is at least one machine readable non-transitory storage medium having instructions stored thereon for providing data-centric computer security between a first device and a second device remote from the first device, wherein the instructions when executed by at least one processor cause the at least one processor to perform the following operations: receiving a data file at the second device; retrieving a record associated with the data file, wherein the record comprises: an identifier of the data file, a cryptographic hash of the data file, device information associated with the first device, scan information associated with the security scanner, user information associated with a user of the first device, and a time stamp of the record; rendering at least a part of the record or a derivation thereof for display to a user at the second device.

In Example 12, the subject matter of Example 11 can optionally include rendering the record for display comprising providing a first user interface element indicating an overall level of safety of the data file for the second device, wherein the overall level of safety is determined based on the cryptographic hash of the data file, the device information, the scan information, and the user information.

In Example 13, the subject matter of Example 12 can optionally include determining the overall level of safety of the data file for the second device based further on device information associated with the second device and/or user information associated with a user of the second device.

In Example 14, the subject matter of any one of the Examples 11-13 can optionally include rendering the record for display comprises providing a second user interface element displaying one or more of the following: a device reputation indicator determined based on the device information associated with the first device; a user reputation indicator determined based on the user information associated with the user of the first device; and a file reputation indicator determined based on the cryptographic hash and the scan information.

In Example 15, the subject matter of any one of the Examples 11-14 can optionally include: the record further comprising privacy information comprising at least one of: privacy reputation of a user of the first device, and the manner in which the user of the first device is linked to a user of the second device.

In Example 16, the subject matter of Example 15 can optionally include rendering the record for display comprising providing a second user interface element displaying a privacy reputation indicator determined based on the privacy information and user information associated with the user of the second device.

Example 17 is an apparatus for providing data-centric computer security between a first device and a second device remote from the first device, the apparatus comprising: at least one memory element; at least one processors coupled to the at least one memory element; a file sharing client of the first device that when executed by the at least one processors is configured to: create a record associated with a data file based in part on scan results from a security scanner of the first device, the record comprising: an identifier of the data file, a cryptographic hash of the data file, device information associated with the first device, scan information associated with the security scanner, user information associated with a user of the first device, and a time stamp of the record; and make the record accessible by the second device.

In Example 18, the subject matter of Example 17 can optionally include: the file sharing client being further configured to receive contextual information associated with the second device from the second device; and the security scanner of the first device being configured to scan the data file for malware contextually relevant to the second device based on contextual information received from the second device.

In Example 19, the subject matter of Examples 17 or 18 can optionally include the device information comprising at least one of: reputation of the device, identifier of the security software, version of the security software; and operating system platform version.

In Example 20, the subject matter of any one of the Examples 17-19 can optionally include: the scan information comprising at least one of: scan status or results, scan parameters, and target platforms for which the security scanner scanned.

In Example 21, the subject matter of any one of the Examples 17-20 can optionally include the user information comprising at least one of: reputation of the user of the first device, and the manner in which the user of the first device is linked to a user of the second device.

In Example 22, the subject matter of any one of the Examples 17-21 can optionally include the record further comprising privacy information comprising at least one of: privacy reputation of a user of the first device, and the manner in which the user of the first device is linked to a user of the second device.

In Example 23, the subject matter of any one of the Examples 17-21 can optionally include the file sharing client of the first client device being further configured to transmit the record associated with the data file along with the data file from the first device to the second device.

In Example 24, the subject matter of any one of the Examples 17-22 can optionally include the file sharing client of the first client device being further configured to transmit the record associated with the data file to a network resource, wherein the network resource is accessible by the second device.

Example 25 is an apparatus for providing data-centric computer security between a first device and a second device remote from the first device, the apparatus comprising: at least one memory element; at least one processors coupled to the at least one memory element; a sharing service that when executed by the at least one processors is configured to: receive a record at a sharing service system from the first device, wherein the record is associated with a data file and comprises an identifier of the data file, a cryptographic hash of the data file, device information associated with the first device, scan information associated with the security scanner, user information associated with a user of the first device, and a time stamp of the record; augment the record, before providing the record to the second device, with user reputation information determined based on a history associated with the user of the first device; and provide at least a part of the record or a derivation thereof to the second device.

In Example 26, the subject matter of Example 25 can optionally include the sharing service being further configured to: query the second device to retrieve information associated with the second device and/or user information associated with a user of the second device; and provide the at least a part of the record or the derivation thereof to the second device based on the information associated with the second device and/or the user information associated with the user of the second device.

Example 27 is an apparatus for providing data-centric computer security between a first device and a second device remote from the first device, the apparatus comprising: at least one memory element; at least one processors coupled to the at least one memory element; a file sharing client of the second device that when executed by the at least one processors is configured to receive a data file at the second device; a record reader of the second device that when executed by the at least one processors is configured to: retrieve a record associated with the data file, wherein the record comprises: an identifier of the data file, a cryptographic hash of the data file, device information associated with the first device, scan information associated with the security scanner, user information associated with a user of the first device, and a time stamp of the record; determine a contextually-relevant record using on information associated with the second device and/or user information associated with a user of the second device; and render the contextually-relevant record for display to a user at the second device.

In Example 28, the subject matter of Example 27 can optionally include the record reader of the second device being configured to: provide a first user interface element indicating an overall level of safety of the data file for the second device, wherein the overall level of safety is determined based on the cryptographic hash of the data file, the device information, the scan information, and the user information.

In Example 29, the subject matter of Example 28 can optionally include the record reader of the second device being configured to: determine the overall level of safety of the data file for the second device based further on device information associated with the second device and/or user information associated with a user of the second device.

In Example 30, the subject matter of any one of the Examples 27-29 can optionally include the record reader of the second device being configured to provide a second user interface element configured to display one or more of the following: a device reputation indicator determined based on the device information associated with the first device; a user reputation indicator determined based on the user information associated with the user of the first device; and a file reputation indicator determined based on the cryptographic hash and the scan information.

In Example 31, the subject matter of any one of the Examples 27-30 can optionally include the record further comprising privacy information comprising at least one of: privacy reputation of a user of the first device, and the manner in which the user of the first device is linked to a user of the second device.

In Example 32, the subject matter of Example 31 can optionally include the record reader of the second device being configured to provide a second user interface element configured to display a privacy reputation indicator determined based on the privacy information and user information associated with the user of the second device.

Example 33 is method for providing data-centric computer security between a first device and a second device remote from the first device, comprising: retrieving scan results associated with a data file from a security scanner of the first device; creating, using a file sharing client, a record associated with the data file based in part on scan results, the record comprising: an identifier of the data file, a cryptographic hash of the data file, device information associated with the first device, scan information associated with the security scanner, user information associated with a user of the first device, and a time stamp of the record; and making, using the file sharing client, the record accessible by the second device.

In Example 34, the subject matter of Example 33 can optionally include receiving, at the file sharing client of the first device, contextual information associated with the second device from the second device; and scanning, using the security scanner of the first device, the data file for malware contextually relevant to the second device based on contextual information received from the second device.

In Example 35, the subject matter of Example 33 or 34 can optionally include the device information comprising at least one of: reputation of the device, identifier of the security software, version of the security software; and operating system platform version.

In Example 36, the subject matter of any one of the Examples 33-35 can optionally include the scan information comprising at least one of: scan status or results, scan parameters, and target platforms for which the security scanner scanned.

In Example 37, the subject matter of any one of the Examples 33-36 can optionally include the user information comprising at least one of: reputation of the user of the first device, and the manner in which the user of the first device is linked to a user of the second device.

In Example 38, the subject matter of any one of the Examples 33-37 can optionally include the record further comprising privacy information comprising at least one of: privacy reputation of a user of the first device, and the manner in which the user of the first device is linked to a user of the second device.

In Example 39, the subject matter of any one of the Examples 33-38 can optionally include transmitting the record associated with the data file along with the data file from the first device to the second device.

In Example 40, the subject matter of any one of the Examples 33-38 can optionally include transmitting the record associated with the data file to a network resource, wherein the network resource is accessible by the second device.

Example 41 is a method for providing data-centric computer security between a first device and a second device remote from the first device, the method comprising: receiving, at a sharing service system communicably connected to the first device and the second device, a record at a sharing service system from the first device, wherein the record is associated with a data file and comprises an identifier of the data file, a cryptographic hash of the data file, device information associated with the first device, scan information associated with the security scanner, user information associated with a user of the first device, and a time stamp of the record; augmenting the record, before providing the record to the second device, with user reputation information determined based on a history associated with the user of the first device; and providing at least a part of the record or a derivation thereof to the second device.

In Example 42, the subject matter of Example 41 can optionally include querying the second device to retrieve information associated with the second device and/or user information associated with a user of the second device; and providing the at least a part of the record or the derivation thereof to the second device based on the information associated with the second device and/or the user information associated with the user of the second device.

Example 43 is a method for providing data-centric computer security between a first device and a second device remote from the first device, the method comprising: receiving a data file at the second device; retrieving a record associated with the data file, wherein the record comprises: an identifier of the data file, a cryptographic hash of the data file, device information associated with the first device, scan information associated with the security scanner, user information associated with a user of the first device, and a time stamp of the record; determining a contextually-relevant record using on information associated with the second device and/or user information associated with a user of the second device; rendering the contextually-relevant record for display to a user at the second device.

In Example 44, the subject matter of Example 43 can optionally include providing a first user interface element indicating an overall level of safety of the data file for the second device, wherein the overall level of safety is determined based on the cryptographic hash of the data file, the device information, the scan information, and the user information.

In Example 45, the subject matter of Example 44 can optionally include determining the overall level of safety of the data file for the second device based further on device information associated with the second device and/or user information associated with a user of the second device.

In Example 46, the subject matter of any one of the Examples 43-45 can optionally include providing a second user interface element configured to display one or more of the following: a device reputation indicator determined based on the device information associated with the first device; a user reputation indicator determined based on the user information associated with the user of the first device; and a file reputation indicator determined based on the cryptographic hash and the scan information.

In Example 47, the subject matter of any one of the Examples 43-45 can optionally include the record further comprising privacy information comprising at least one of: privacy reputation of a user of the first device, and the manner in which the user of the first device is linked to a user of the second device.

In Example 48, the subject matter of Example 47 can optionally include providing a second user interface element configured to display a privacy reputation indicator determined based on the privacy information and user information associated with the user of the second device.

Example 49 is an apparatus for providing data-centric computer security between a first device and a second device remote from the first device, the apparatus comprising: means for scanning a data file using a security scanner at the first device; means for creating a record associated with the data file based in part on results from the security scanner, the record comprising: an identifier of the data file, a cryptographic hash of the data file, device information associated with the first device, scan information associated with the security scanner, user information associated with a user of the first device, and a time stamp of the record; and means for making the record accessible by the second device.

Example 50 is an apparatus for providing data-centric computer security between a first device and a second device remote from the first device, the apparatus comprising: means for receiving a record at a sharing service system from the first device, wherein the record is associated with a data file and comprises an identifier of the data file, a cryptographic hash of the data file, device information associated with the first device, scan information associated with the security scanner, user information associated with a user of the first device, and a time stamp of the record; means for querying the second device to retrieve information associated with the second device and/or user information associated with a user of the second device; and means for providing at least a part of the record or a derivation thereof to the second device based on the information associated with the second device and/or the user information associated with the user of the second device.

Example 51 is an apparatus for providing data-centric computer security between a first device and a second device remote from the first device, the apparatus comprising: means for receiving a data file at the second device; means for retrieving a record associated with the data file, wherein the record comprises: an identifier of the data file, a cryptographic hash of the data file, device information associated with the first device, scan information associated with the security scanner, user information associated with a user of the first device, and a time stamp of the record; and means for rendering at least a part of the record or a derivation thereof for display to a user at the second device.

Example 52 is an apparatus for providing data-centric computer security between a first device and a second device remote from the first device, the apparatus comprising means for performing the method of any one of claims 33-48.

In Example 53, the subject matter of Example 52 can optionally include the means for performing the method comprising at least one processors and at least one memory element.

In Example 54, the subject matter of Example 53 can optionally include the at least one memory element comprising machine readable instructions that when executed, cause the apparatus to perform the method in any one of Examples 33-48.

In Example 55, the subject matter of any one of the Examples 52-54 can optionally include the apparatus being a computing device.

Example 56 is at least one machine readable storage medium comprising instructions for providing data-centric computer security between a first device and a second device remote from the first device, wherein the instructions when executed implement a method or realize an apparatus described in any of the Examples 17-55.

Example 57 is a record for providing data-centric computer security between a first device and a second device remote from the first device, the record being associated with a data file scanned by a security scanner of the first device and usable by the second device to provide computer security, the record comprising: an identifier of the data file; a cryptographic hash of the data file; device information associated with the first device; scan information associated with the security scanner; user information associated with a user of the first device; and a time stamp of the record.

What is claimed is:

1. At least one machine readable non-transitory storage medium having instructions stored thereon for providing data-centric computer security between a first device and a second device remote from the first device, wherein the instructions when executed by at least one processor cause the at least one processor to perform the following operations:
   receiving a record at a sharing service system from the first device, wherein the record is associated with a data file and comprises an identifier of the data file, a cryptographic hash of the data file, device information associated with the first device, scan information associated with the security scanner, user information associated with a user of the first device, and a time stamp of the record;
   querying the second device to retrieve information associated with the second device and/or user information associated with a user of the second device; and
   providing at least a part of the record or a derivation thereof to the second device based on the information associated with the second device and/or the user information associated with the user of the second device.

2. The at least one machine readable non-transitory storage medium of claim 1, wherein the operations further comprise:
   augmenting the record, before providing the record to the second device, with user reputation information determined based on a history associated with the user of the first device.

3. The at least one machine readable non-transitory storage medium of claim 1, wherein the operations further comprise:
   augmenting the record with a scan reputation, a scan status/result, a device reputation, or privacy information.

4. The at least one machine readable non-transitory storage medium of claim 1, wherein the operations further comprise:
   receiving the data file from the first device; and
   providing the data file to the second device.

5. The at least one machine readable non-transitory storage medium of claim 1, wherein the information associated with the second device indicates a platform of the second device.

6. The at least one machine readable non-transitory storage medium of claim 1, wherein the operations further comprise:
   scanning the data file.

7. The at least one machine readable non-transitory storage medium of claim 1, wherein the operations further comprise:
   determining an overall safety of the data file for the second device, based on the information associated with the second device or the user information associated with the user of the second device.

8. An apparatus for providing data-centric computer security between a first device and a second device remote from the first device, the apparatus comprising:
   at least one memory element;
   at least one processor coupled to the at least one memory element; and
   a sharing service that, when executed by the at least one processor, is configured to
      receive a record at a sharing service system from the first device, wherein the record is associated with a data file and comprises an identifier of the data file, a cryptographic hash of the data file, device information associated with the first device, scan information associated with a security scanner, user information associated with a user of the first device, or a time stamp of the record,
      query the second device to retrieve information associated with the second device and/or user information associated with a user of the second device, and
      provide at least a part of the record or a derivation thereof to the second device based on the information associated with the second device and/or the user information associated with the user of the second device.

9. The apparatus of claim 8, wherein the sharing service further is configured to augment the record, before providing the record to the second device, with user reputation information determined based on a history associated with the user of the first device.

10. The apparatus of claim 8, wherein the sharing service further is configured to augment the record with a scan reputation, a scan status/result, a device reputation, or privacy information.

11. The apparatus of claim 8, wherein the sharing service further is configured to receive the data file from the first device and to provide the data file to the second device.

12. The apparatus of claim 8, wherein the information associated with the second device indicates a platform of the second device.

13. The apparatus of claim 8, wherein the sharing service further is configured to scan the data file.

14. The apparatus of claim 8, wherein the sharing service further is configured to determine an overall safety of the data file for the second device, based on the information associated with the second device or the user information associated with the user of the second device.

15. A method for providing data-centric computer security between a first device and a second device remote from the first device, the method comprising:
   receiving a record at a sharing service system from the first device, wherein the record is associated with a data file and comprises an identifier of the data file, a cryptographic hash of the data file, device information associated with the first device, scan information associated with a security scanner, user information associated with a user of the first device, or a time stamp of the record;
   querying the second device to retrieve information associated with the second device and/or user information associated with a user of the second device; and
   providing at least a part of the record or a derivation thereof to the second device based on the information associated with the second device and/or the user information associated with the user of the second device.

16. The method of claim 15, further comprising:
   augmenting the record, before providing the record to the second device, with user reputation information determined based on a history associated with the user of the first device.

17. The method of claim 15, further comprising:
   augmenting the record with a scan reputation, a scan status/result, a device reputation, or privacy information.

18. The method of claim 15, further comprising:
   receiving the data file from the first device; and
   providing the data file to the second device.

19. The method of claim 15, wherein the information associated with the second device indicates a platform of the second device.

20. The method of claim 15, further comprising:
 determining an overall safety of the data file for the second device, based on the information associated with the second device or the user information associated with the user of the second device.

* * * * *